US010068239B2

(12) United States Patent
Gerard et al.

(10) Patent No.: US 10,068,239 B2
(45) Date of Patent: Sep. 4, 2018

(54) SYSTEMS AND METHODS FOR DETERMINING ENHANCED MERCHANT IDENTIFICATION

(71) Applicant: MasterCard International Incorporated, Purchase, NY (US)

(72) Inventors: Jean-Pierre Gerard, Croton-On-Hudson, NY (US); Kenny Unser, Fairfield, CT (US); Kent Olof Niklas Berntsson, Rye, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 541 days.

(21) Appl. No.: 14/448,471

(22) Filed: Jul. 31, 2014

(65) Prior Publication Data
US 2016/0034917 A1   Feb. 4, 2016

(51) Int. Cl.
G06Q 30/02   (2012.01)
(52) U.S. Cl.
CPC ................... G06Q 30/0201 (2013.01)
(58) Field of Classification Search
CPC .... G06Q 10/00; G06Q 40/00; G06Q 30/0201; G06F 17/60
USPC ........................................... 705/7.29
See application file for complete search history.

(56) References Cited

U.S. PATENT DOCUMENTS

| 5,433,483 | A | 7/1995 | Yu |
| 6,351,735 | B1 | 2/2002 | Deaton et al. |
| 7,680,739 | B1 | 3/2010 | Venturo et al. |
| 7,783,563 | B2 | 8/2010 | Tidwell et al. |
| 7,856,403 | B2 | 12/2010 | Venturo et al. |
| 8,175,908 | B1 * | 5/2012 | Anderson ........... G06Q 30/0201 705/7.29 |
| 8,452,708 | B1 * | 5/2013 | Birenbaum ............ G06Q 40/00 705/35 |
| 8,612,317 | B1 * | 12/2013 | Harman ............. G06Q 20/0453 705/16 |
| 8,762,270 | B1 * | 6/2014 | Evans .................... G06Q 40/00 379/114.14 |
| 9,741,030 | B2 * | 8/2017 | Tavares ................ G06Q 20/322 |
| 2003/0061132 | A1 | 3/2003 | Mason et al. |
| 2003/0172030 | A1 | 9/2003 | Volgunin |
| 2003/0187784 | A1 * | 10/2003 | Maritzen ................ G06Q 30/06 705/39 |

(Continued)

Primary Examiner — Romain Jeanty
(74) Attorney, Agent, or Firm — Armstrong Teasdale LLP

(57) ABSTRACT

A computer implemented method for creating merchant profiles based on check transactions is provided. The method uses a computing device having a processor communicatively coupled to a memory. The method includes receiving a plurality of payment transactions including payment by a check where each payment transaction includes plurality of fields from the associated check that include at least a payee field, an address field, and a memo field, generating a list of unique merchants based in part on the payee fields of the plurality of payment transactions, generating two or more merchant profiles, and determining one or more connections between two or more merchant profiles in the plurality of merchant profiles. Each connection represents a relationship or association between two or more merchant profiles. The method also includes storing the one or more connections and the two or more merchant profiles.

18 Claims, 10 Drawing Sheets

(56) References Cited

U.S. PATENT DOCUMENTS

| | | | |
|---|---|---|---|
| 2006/0149671 A1* | 7/2006 | Nix | G06Q 20/04 705/40 |
| 2009/0112661 A1* | 4/2009 | Mullen | G06Q 20/023 705/35 |
| 2010/0138288 A1* | 6/2010 | Walker | G06Q 20/042 705/14.25 |
| 2013/0212010 A1* | 8/2013 | Mullen | G06Q 20/023 705/40 |
| 2014/0040145 A1* | 2/2014 | Ozvat | G06Q 20/401 705/64 |
| 2014/0058862 A1* | 2/2014 | Celkonas | G06Q 20/12 705/18 |
| 2014/0236842 A1* | 8/2014 | Salminen | G06Q 20/20 705/75 |

* cited by examiner

SYSTEMS AND METHODS FOR DETERMINING ENHANCED MERCHANT IDENTIFICATION

BACKGROUND OF THE DISCLOSURE

The field of the disclosure relates generally to capturing and analyzing data from check transactions, and more particularly, to network-based systems and methods for capturing, cleansing, and analyzing data from check transactions to identify the merchants associated with those transactions to create or enhance merchant profiles.

At least some payment card processing networks and some payment card issuing banks offer a service that provides additional information for purchasing information found on payment card billing statements. For example, when a payment cardholder is unsure about a charge on his or her billing statement, the cardholder will contact the card issuer. Under the existing service, the issuer enters the description provided on the billing statement, and the service provides a more detailed description of the merchant associated with the payment card transaction. Further, the nature of payment card processing allows payment card processing networks to analyze payment card transactions for patterns to improve fraud analysis. However, these services fail to provide the same options for processed check transactions.

BRIEF DESCRIPTION OF THE DISCLOSURE

In one embodiment, a computer implemented method for creating merchant profiles based on check transactions is provided. The method uses a computing device having a processor communicatively coupled to a memory. The method includes receiving by the processor a plurality of payment transactions including one or more payments by check. Each payment transaction includes a plurality of fields from an associated check that include at least a payee field, an address field, and a memo field. The method also includes generating by the processor a list of unique merchants based in part on the payee fields of the plurality of payment transactions, and generating by the processor two or more merchant profiles. Each merchant profile is generated for one of the unique merchants. The method further includes determining by the processor one or more connections between two or more merchant profiles in the plurality of merchant profiles. Each connection represents a relationship or association between two or more merchant profiles. Moreover, the method includes storing in the memory the one or more connections and the two or more merchant profiles.

In another embodiment, a computing device for creating merchant profiles based on check transactions is provided. The computing device comprising one or more processors communicatively coupled to one or more memory devices. The computing device is configured to receive a plurality of payment transactions including one or more payments by check. Each payment transaction includes a plurality of fields from an associated check that include at least a payee field, an address field, and a memo field. The computing device is further configured to generate a list of unique merchants based in part on the payee fields of the plurality of payment transactions, generate two or more merchant profiles where each merchant profile is generated for one of the unique merchants, and determine one or more connections between two or more merchant profiles in the plurality of merchant profiles. Each connection represents a relationship or association between two or more merchant profiles. Moreover, the computing device is configured to store the one or more connections and the two or more merchant profiles.

In yet another embodiment, a computer-readable storage medium having computer-executable instructions embodied thereon is provided. When executed by a computing device having at least one processor coupled to at least one memory device, the computer-executable instructions cause the processor to receive a plurality of payment transactions including one or more payments by check. Each payment transaction includes a plurality of fields from an associated check that include at least a payee field, an address field, and a memo field. The computer-executable instructions also cause the processor to generate a list of unique merchants based in part on the payee fields of the plurality of payment transactions, and generate two or more merchant profiles. Each merchant profile is generated for one of the unique merchants. The computer-executable instructions further cause the processor to determine one or more connections between two or more merchant profiles in the plurality of merchant profiles. Each connection represents a relationship or association between two or more merchant profiles. Moreover, the computer-executable instructions cause the processor to store the one or more connections and the two or more merchant profiles.

BRIEF DESCRIPTION OF THE DRAWINGS

FIG. 1 is a schematic diagram illustrating an example multi-party check processing system for enabling ordinary payment-by-check transactions in which an account holder makes a check payment to a merchant, and the check is drawn to an account issued by an issuing bank.

FIG. 2 is a schematic of a check that may be used in a financial transaction, such as the transaction described in FIG. 1.

FIG. 3 is a schematic diagram illustrating an example multi-party transaction card processing system for enabling ordinary payment-by-card transactions in which merchants and card issuers do not need to have a one-to-one special relationship.

FIG. 4 is a block diagram of an example payment processing system used for determining the merchant associated with check transactions in accordance with one example embodiment of the present disclosure.

FIG. 5 illustrates an example configuration of a client system shown in FIG. 4, in accordance with one embodiment of the present disclosure.

FIG. 6 illustrates an example configuration of the merchant identifying (MI) computing device shown in FIG. 4, in accordance with one embodiment of the present disclosure.

FIG. 7 is a simplified block diagram of an example embodiment of a system for determining which merchants are associated with which transactions from a plurality of transactions received from the payment card processing system and the check processing system.

FIG. 8 is a flowchart of an example process for creating merchant profiles using the payment processing system and the MI computer device in accordance with one embodiment of the disclosure.

FIG. 9 is a flowchart of an example process for associating a check payment transaction with a merchant profile using the payment processing system and the MI computer device in accordance with one embodiment of the disclosure.

FIG. 10 is a diagram of components of one or more example computing devices that may be used in the system shown in FIG. 4.

DETAILED DESCRIPTION OF THE DISCLOSURE

Figure 1:
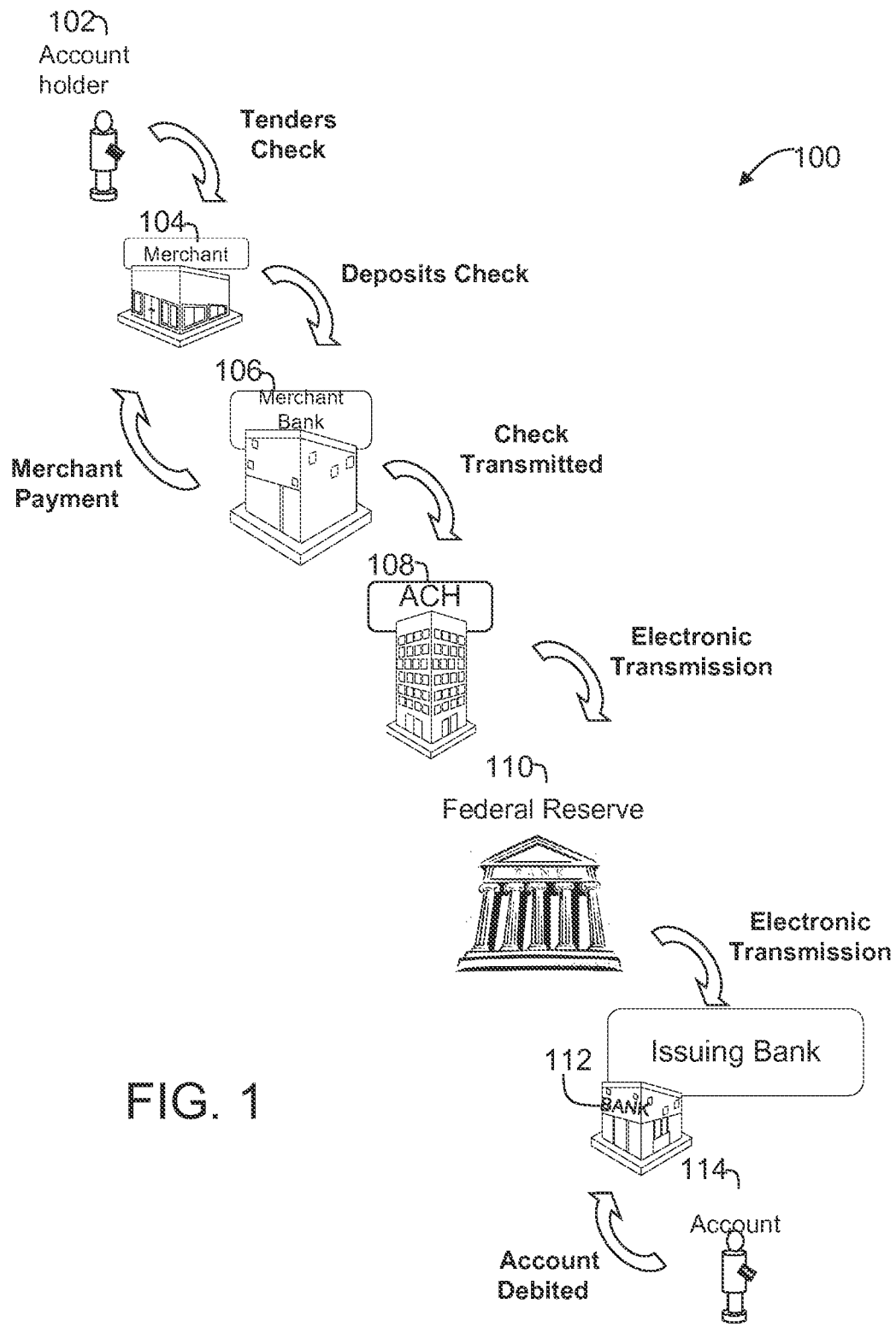
FIGS. 1-10 show example embodiments of the methods and systems described herein.

The following detailed description of the embodiments of the disclosure refers to the accompanying drawings. The same reference numbers in different drawings may identify the same or similar elements. Also, the following detailed description does not limit the claims.

The systems and methods described herein are configured to capture, cleanse, and analyze data from check transactions to identify the merchants associated with those transactions, and to create or enhance merchant profiles. A merchant identifying ("MI") computer device receives a plurality of payment transactions. The transactions may be for check transactions processed through a check processing system or for payment card transactions processed through a payment card system. The MI computer device determines an identity for each merchant associated with each transaction from the transaction data. In some embodiments, the MI computer device compares the transaction to a database with a complete list of payment card and check merchants. In other embodiments, MI computer device uses logical rules to determine the merchant identity from the transaction data. If the MI computer device received the transaction data for the check transactions as scanned images, then the MI computer device performs optical character recognition analysis on the scanned images. The merchant identity may be a name from a payee field on a check, or the merchant identity may be a combination of fields, such as, but not limited to payee field, memo field, and address field.

The MI computer device generates a list of unique merchants from the transaction data. Unique merchants are merchants that are distinctive from the other merchants, potentially determined through distinct names. In some embodiments, the MI computer device may consider "Groceries & Gas #125" distinct from "Anytown Groceries and Gas" even if they refer to the same store, and further consider those two distinct from "G & G". In other embodiments, the MI computer device uses logic to determine that "Anytown Groceries & Gas," "Anytown Groceries and Gas," "Groc & Gas Anytown," and "Grocery & Gus in Anytown," all refer to the same unique merchant. For each unique merchant, the MI computer device generates a merchant profile. Each merchant profile may contain all of the transactions associated with that unique merchant, as well as other information that MI computer device determines based on the transactions. The merchant profile may include, but is not limited to, a merchant identifier, a merchant category, transactions associated with that merchant, merchant location, connections to associated merchants, a description of the merchant, contact information, channel (i.e., e-commerce, brick and mortar, or phone order), other names associated with merchant, and logic to identify the merchant from check transaction data. In some embodiments, the merchant profile may also provide aggregated transactions over time, returns over time, and other merchant behavior patterns.

In the example embodiment, the MI computer device analyzes the generated merchant profiles to determine connections between them. Connections represent a relationship or association between the two or more merchant profiles. For example, one merchant profile may be for an individual store in a chain of stores, e.g., Groceries and Gas #125. In another example, a merchant profile for an individual store may have multiple names, be called by a shortened name, or be doing business under a name that is different from its parent company. For example, the MI computer device may determine that the merchant profiles for "Groceries & Gas" and "Anytown Groceries and Gas" are related, potentially as a parent-child relationship. The MI computer device determines these associations based on comparing the transactions in each merchant profile. The MI computer device may create a hierarchy of merchant profiles wherein the parent and child profiles would have connections to each other. For example, Gas and Groceries, Inc. would be a parent merchant and Gas and Groceries #125 would be a child of that parent. The MI computer device adds an association between the two merchant profiles to each of those two merchant profiles. The MI computer device then stores the merchant profiles in a database.

In some embodiments, after the merchant profiles are created and stored, the MI computer device updates the merchant profiles with additional check transactions. In these embodiments, the MI computer device receives a check payment transaction from the check processing system. The MI computer device compares the payee field of the check payment transaction with known merchant profiles stored in database. The MI computer device determines if a merchant profile already exists for the merchant identified with the check payment transaction. If the determination is yes, then the MI computer device assigns the transaction to the determined merchant profile. If the determination is no, then the MI computer device generates a merchant profile for that merchant and stores that merchant profile in the database.

In the example embodiment, the MI computer device stores merchant profiles without including any protected personal information. Personally identifiable information (PII) is information that can be used on its own or with other information to identify, contact, or locate a single person, or to identify an individual in context. Accordingly, information which can identify a purchaser is not stored at the MI computer device. In alternative embodiments, personally identifiable information may be otherwise safeguarded by the policies of systems using merchant profiles. In such alternative embodiments, personally identifiable information may be available, for example if the individual consents to his PII being available.

The MI computer device also receives merchant listing data. Merchant listing data represents publically available data about merchants. Merchant listing data may also include, for example and without limitation, affiliated merchants, corporate hierarchy, parent corporations, subsidiaries, other name merchant is doing business as, and corporate annual reports. Merchant listing data may be stored in a database accessible to the MI computer device, retrieved from an external service or database, retrieved from online or offline publications, or manually entered into the MI computer device. In some embodiments, the MI computer device combines transactions and merchant listing data to generate a merchant profile. In other embodiments, the MI computer device just processes the transactions to generate the merchant profile.

In the example embodiment, the MI computer device may receive a request from a client device for one or more merchant profiles. In the request, the MI computer device receives a merchant name from the client device. The MI computer device compares the received merchant name to the stored merchant profiles. If a match is found, then the MI computer device transmits the associated merchant profile to the client device. In some embodiments, the MI computer device may determine that the merchant name could refer to multiple merchant profiles. In this embodiment, the MI computer device may request more clarification from the client device or may transmit all merchant profiles associated with the received merchant name.

In another embodiment, the MI computer device may allow client devices to access merchant profiles and the associated transactions to run analytics on the transactions. The analytics may include determining check payments by industry, by merchant, and by geographic area. The analytics may also include comparing different payment channels, i.e., credit transactions vs. debit transactions vs. check transactions. The analytics may also be used for fraud analysis, to either detect fraudulent transactions or to improve existing fraud detection processes.

The methods and systems described herein may be implemented using computer programming or engineering techniques including computer software, firmware, hardware, or any combination or subset wherein a technical effect of the systems and processes described herein is achieved by performing at least one of the following steps: (a) receiving a plurality of payment transactions initiated by checks; (b) generating a list of unique merchants based on the plurality of payment transactions; (c) generating two or more merchant profiles, wherein each merchant profile is generated for one of the unique merchants; (d) determining one or more connections between two or more merchant profiles in the plurality of merchant profiles; and (e) storing the one or more connections and the two or more merchant profiles, by performing these steps, the resulting technical effect includes at least determining the organizational structure of the merchants associated with the transactions.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the capture and analysis of check transaction data.

FIG. 1 is a schematic diagram illustrating an example multi-party check processing system 100 for enabling ordinary payment-by-check transactions in which an account holder 102 makes a check payment to a merchant 104 (also known as an originating merchant), and the check is drawn to an account issued by an issuing bank 112. A check, as used in such a payment transaction, is a form of a bill of exchange. A check is typically a written order from one person (the payor) to another (the payee), signed by the payor, and requiring the bank at which the payor holds a checking account to pay on demand or at some fixed future date, a certain sum of money, to either the person identified as payee or to any person presenting the check, such as the bank at which the payee holds an account. Checks can be either paper or electronic. A paper check is a physical written instrument. An electronic check (also known as an eCheck) is an electronic form of a paper check. An electronic check can be used and processed similarly to a paper check.

In one embodiment, the customer or account holder 102 pays a bill of sale at the merchant 104 using a paper check. In such a case, the customer 102 is considered the payor and the merchant 104 is the payee. Generally, the customer 102 also provides the merchant 104 with identification and/or contact information in case a check is returned as nonpayable. The merchant 104 then deposits the check to a merchant bank 106, which is a bank at which the merchant 104 holds an account. Typically, at the end of the business day, the merchant 104 deposits the check, along with all other checks received that day. After the merchant bank 106 posts the value of the check to the merchant's account, the merchant bank 106 sends the check to an automated clearing house (ACH) 108. One example of an automated clearing house 108 is the National Automated Clearing House Association (NACHA). The ACH 108 sorts all received checks according to the issuing bank 112, which is a bank at which the customer 102 holds an account 114. In the case of paper checks, the ACH 108 also scans each check to generate an electronic image and electronically transmits the electronic images to a Federal Reserve Bank 110. The ACH 108 also sends the paper checks to the issuing bank 112 associated with the account on which the check was drawn. The Federal Reserve Bank 110 receives the electronically transmitted check images from the ACH 108 and, in turn, electronically transmits the images to the issuing bank 112 associated with each check. The issuing bank 112 then debits the customer's account 114 held at the issuing bank 112 and transfers the check amount to the merchant bank 106.

In another embodiment, the customer or account holder 102 pays a bill of sale at a merchant 104 using an electronic check. The merchant 104 then transmits the electronic check to the ACH 108. The ACH 108 notifies the merchant bank 106 of the value of the check. The merchant bank 106 posts the value of the check to the merchant's account. The ACH 108 sorts all received checks according to the issuing bank 112. The ACH 108 transmits the electronic check to the Federal Reserve Bank 110. The Federal Reserve Bank 110 receives the electronic check from the ACH 108 and, in turn, transmits the electronic check to the issuing bank 112 associated with each check. The issuing bank 112 then debits the customer's account 114 held at the issuing bank 112 and transfers the check amount to the merchant bank 106.

Figure 2:
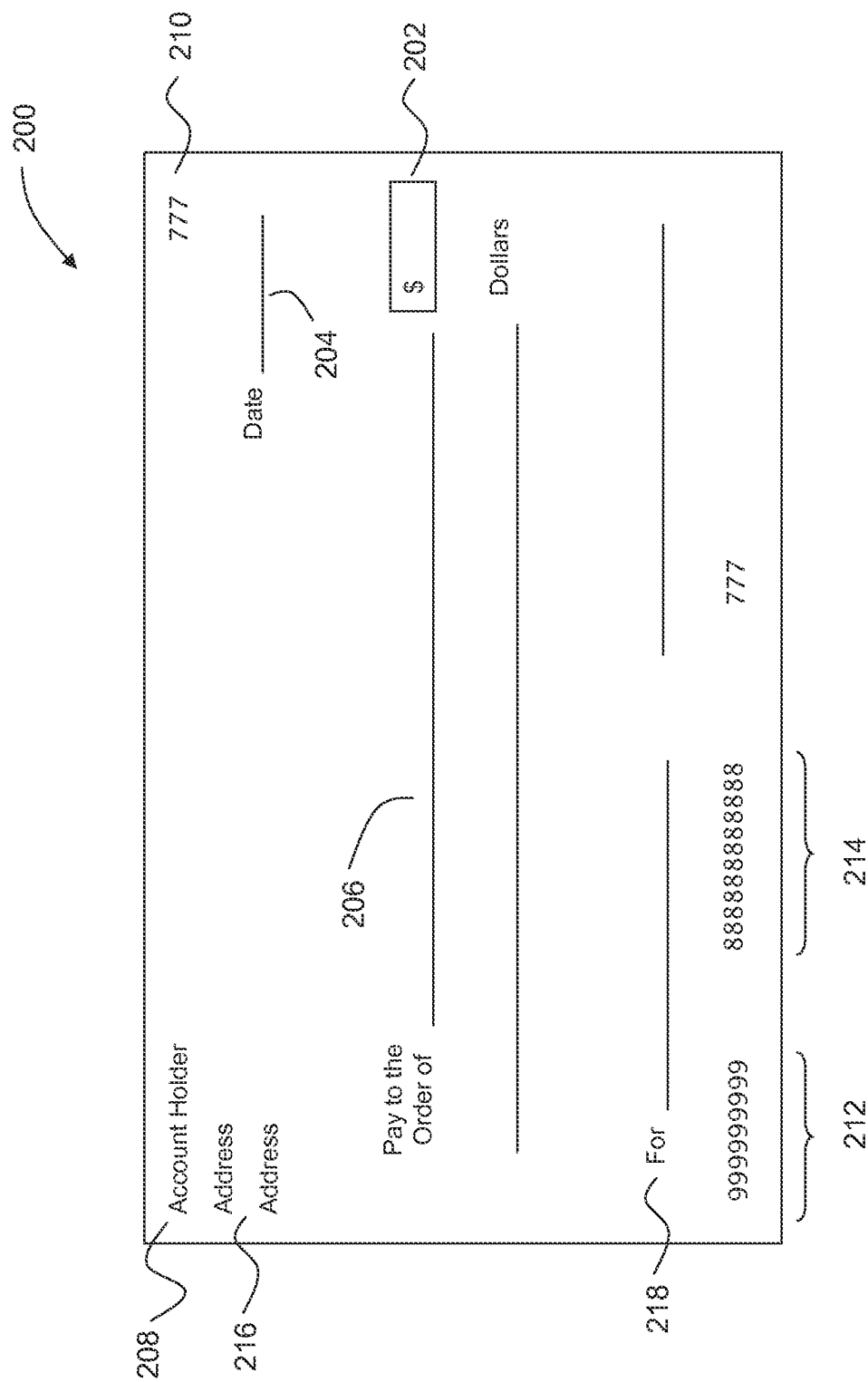

FIG. 2 is a schematic of a check 200 that may be used in a financial transaction, such as the transaction described in FIG. 1. Check 200 includes data relating to the transaction and data relating to the account on which check 200 is drawn. Transaction-related data includes, for example, a transaction amount 202, a transaction date 204, and a payee field 206. Account-related data includes, for example, an account holder's name 208, a check number 210, an issuing bank routing number 212, and an account number 214. Routing number 212 and account number 214 are applied to check 200 using magnetic ink such that a Magnetic Ink Character Recognition (MICR) reader is enabled to read numbers 212 and 214 during the process described above and shown in FIG. 1. Further check 200 also includes an address field 216, which contains the address of the account holder, and a memo field 218 for notes from the account holder.

In some cases, when making a payment, when writing a check to a payee with multiple stores, the account holder may write the full name of the payee, i.e., "Groceries and Gas". In other cases, the account holder may write a check for the same payee as "G&G", "Groceries and Gas #125", or "Anytown Groceries and Gas."

Figure 3:
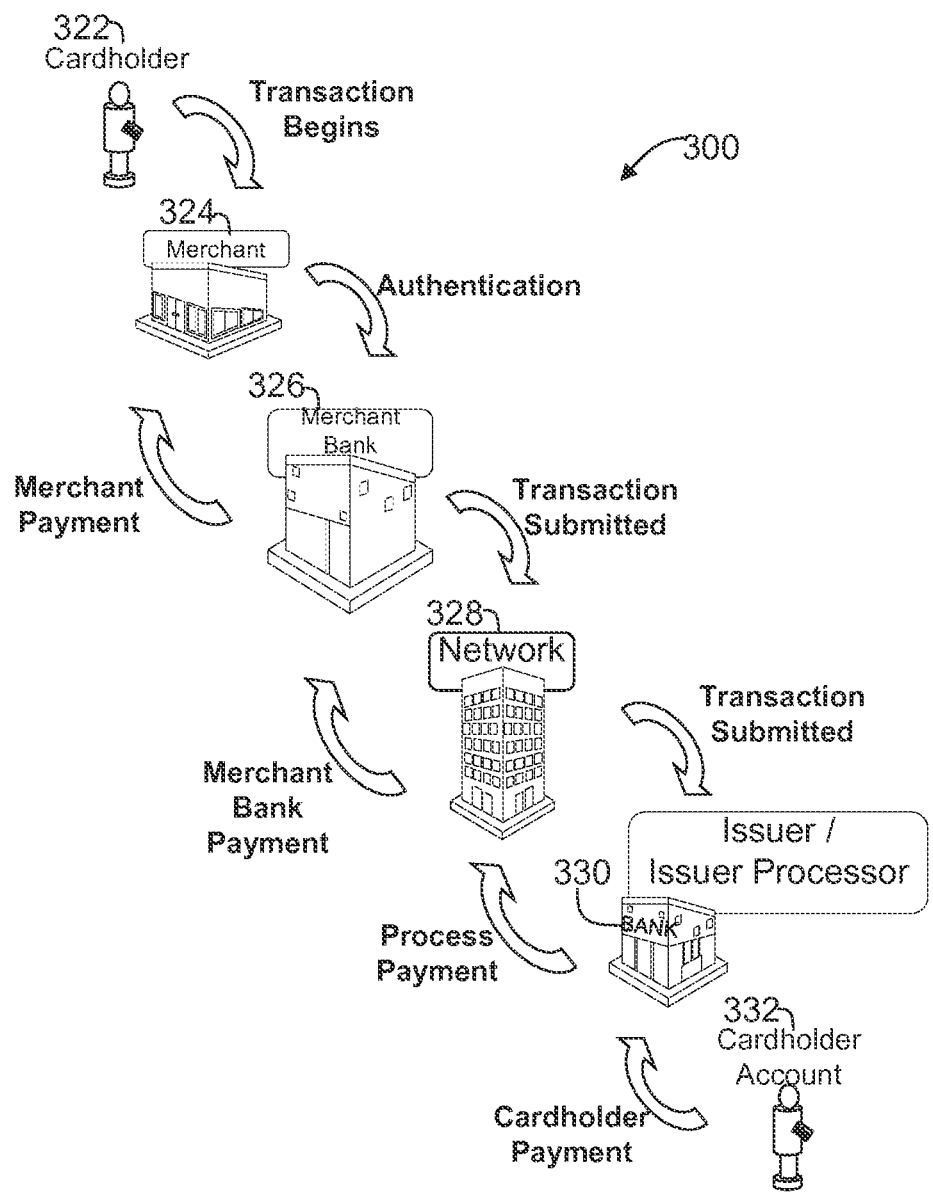

FIG. 3 is a schematic diagram illustrating an example multi-party transaction card processing system 300 for enabling ordinary payment-by-card transactions in which merchants 324 and card issuers 330 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 322, who uses the transaction card to tender payment for a purchase from a merchant 324 (also known as an originating merchant). To accept payment with the transaction card, merchant 324 must normally establish an account with a financial institution that is part of the financial payment system. This financial institution is usually called the "merchant bank," the "acquiring bank," or the "acquirer." When cardholder 322 tenders payment for a purchase with a transaction card, merchant 324 requests authorization from a merchant bank 326 for the amount of the purchase. The request may be performed over the telephone, but is usually performed through the use of a point-of-sale terminal, which reads cardholder's 322 account information from a magnetic stripe, a chip, or embossed characters on the transaction card and communicates electronically with the transaction processing computers of merchant bank 326. Alternatively, merchant bank 326 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 328, computers of merchant bank 326 or merchant processor will communicate with computers of an issuer bank 330 to determine whether cardholder's account 332 is in good standing and whether the purchase is covered by cardholder's 322 available credit line. Based on these determinations, the request for authorization will be declined or accepted. If the request is accepted, an authorization code is issued to merchant 324.

When a request for authorization is accepted, the available credit line of cardholder's account 332 is decreased. Normally, a charge for a payment card transaction is not posted immediately to cardholder's account 332 because bankcard associations, such as MasterCard International Incorporated®, have promulgated rules that do not allow merchant 324 to charge, or "capture," a transaction until goods are shipped or services are delivered. However, with respect to at least some debit card transactions, a charge may be posted at the time of the transaction. When merchant 324 ships or delivers the goods or services, merchant 324 captures the transaction by, for example, appropriate data entry procedures on the point-of-sale terminal. This may include bundling of approved transactions daily for standard retail purchases. If cardholder 322 cancels a transaction before it is captured, a "void" is generated. If cardholder 322 returns goods after the transaction has been captured, a "credit" is generated. Interchange network 328 and/or issuer bank 330 stores the transaction card information, such as a category of merchant, a merchant identifier, a location where the transaction was completed, amount of purchase, date and time of transaction, in a database 410 (shown in FIG. 4).

After a purchase has been made, a clearing process occurs to transfer additional transaction data related to the purchase among the parties to the transaction, such as merchant bank 326, interchange network 328, and issuer bank 330. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 322 purchases travel, such as airfare, a hotel stay, and/or a rental car, at least partial itinerary information is transmitted during the clearance process as transaction data. When interchange network 328 receives the itinerary information, interchange network 328 routes the itinerary information to database 410.

For debit card transactions, when a request for a personal identification number (PIN) authorization is approved by the issuer, cardholder's account 332 is decreased. Normally, a charge is posted immediately to cardholder's account 332. The payment card association then transmits the approval to the acquiring processor for distribution of goods/services or information, or cash in the case of an automated teller machine (ATM).

After a transaction is authorized and cleared, the transaction is settled among merchant 324, merchant bank 326, and issuer bank 330. Settlement refers to the transfer of financial data or funds among merchant's 324 account, merchant bank 326, and issuer bank 330 related to the transaction. Usually, transactions are captured and accumulated into a "batch," which is settled as a group. More specifically, a transaction is typically settled between issuer bank 330 and interchange network 328, and then between interchange network 328 and merchant bank 326, and then between merchant bank 326 and merchant 324.

Figure 4:
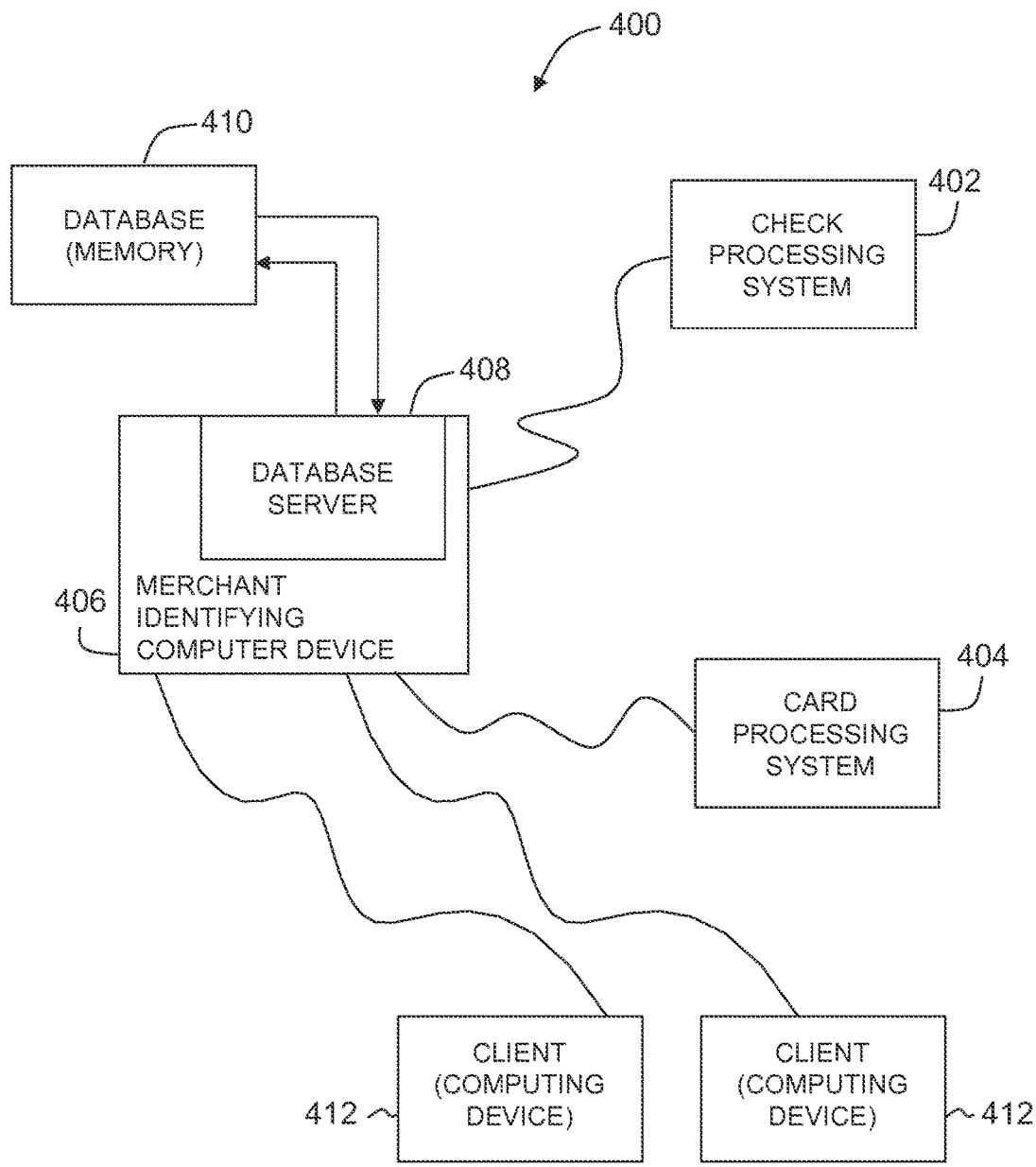

FIG. 4 is a block diagram of an example payment processing system 400 used for determining the merchant associated with check transactions in accordance with one example embodiment of the present disclosure. In the example embodiment, system 400 may be used for aggregating transaction data received from a check processing system 402 and a card processing system 404. In addition, system 400 is used for determining the merchant associated with each transaction, creating and/or enhancing merchant profiles, and reporting those merchant profiles upon request. System 400 includes a merchant identifying (MI) computer device 406.

A database server 408 is communicatively coupled to a database 410 that stores data. In one embodiment, database 410 includes transaction information from check processing system 402 and card processing system 404 and merchant profiles determined from the transaction information. In the example embodiment, database 410 is stored remotely from MI computer device 406. In some embodiments, database 410 is decentralized. In the example embodiment, a person can access database 410 via client systems 412 by logging onto MI computer device 406, as described herein.

In the example embodiment, client systems 412 are computers that include a web browser or a software application, which enables client systems 412 to access MI computer device 406 using the Internet. More specifically, client systems 412 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 412 can be any device capable of accessing the Internet including, but not limited to, a desktop computer, a laptop computer, a personal digital assistant (PDA), a cellular phone, a smartphone, a tablet, a phablet, or other web-based connectable equipment.

MI computer device 406 is communicatively coupled with check processing system 402. Check processing system 402 may be check processing system 100 and be communicating with MI computer device 406 through, for example, a computing device associated with ACH 108, the issuing bank 112, or the merchant bank 106, all shown in FIG. 1. In some embodiments, MI computer device 406 is associated with, or is part of the check processing system 100. In other embodiments, MI computer device 406 is associated with a third party and is merely in communication with the check processing system 100.

MI computer device 406 is communicatively coupled with card processing system 404. Card processing system 404 may be payment card system payment network 300 and be communicating with MI computer device 406 through, for example, a computing device associated with interchange network 328, the issuing bank 330, or the merchant bank 326, all shown in FIG. 3. In some embodiments, MI computer device 406 may be associated with, or is part of the payment card system payment network 300. In other embodiments, MI computer device 406 is associated with a third party and is merely in communication with payment card system payment network 300.

Figure 5:
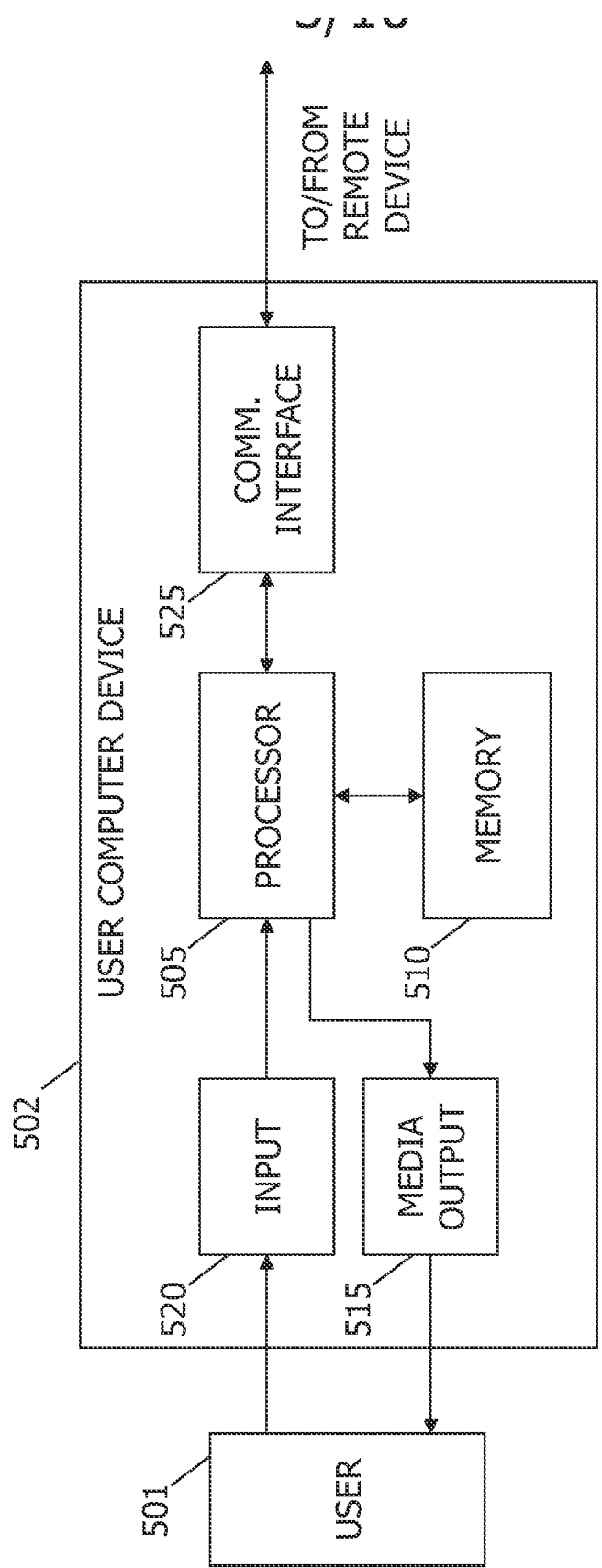

FIG. 5 illustrates an example configuration of a client system 412 shown in FIG. 4, in accordance with one embodiment of the present disclosure. User computer device 502 is operated by a user 501. User computer device 502 may be used to enter transaction data into database 410 (shown in FIG. 4) or to retrieve a merchant profile. User computer device 502 may include, but is not limited to, client systems 412. User computer device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or transaction data to be stored and retrieved. Memory area 510 may include one or more computer readable media.

User computer device 502 also includes at least one media output component 515 for presenting information to user 501. Media output component 515 is any component capable of conveying information to user 501. In some embodiments, media output component 515 includes an output adapter (not shown) such as a video adapter and/or an audio adapter. An output adapter is operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 515 is configured to present a graphical user interface (e.g., a web browser and/or a client application) to user 501. A graphical user interface may include, for example, an online store interface for viewing and/or purchasing items, and/or a wallet application for managing payment information. In some embodiments, user computer device 502 includes an input device 520 for receiving input from user 501. User 501 may use input device 520 to, without limitation, select and/or enter one or more items to purchase and/or a purchase request, or to access credential information, and/or payment information. Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as MI computer device 406 (shown in FIG. 4). Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from MI computer device 406. A client application allows user 501 to interact with, for example, MI computer device 406. For example, instructions may be stored by a cloud service, and the output of the execution of the instructions sent to the media output component 515.

Figure 8:
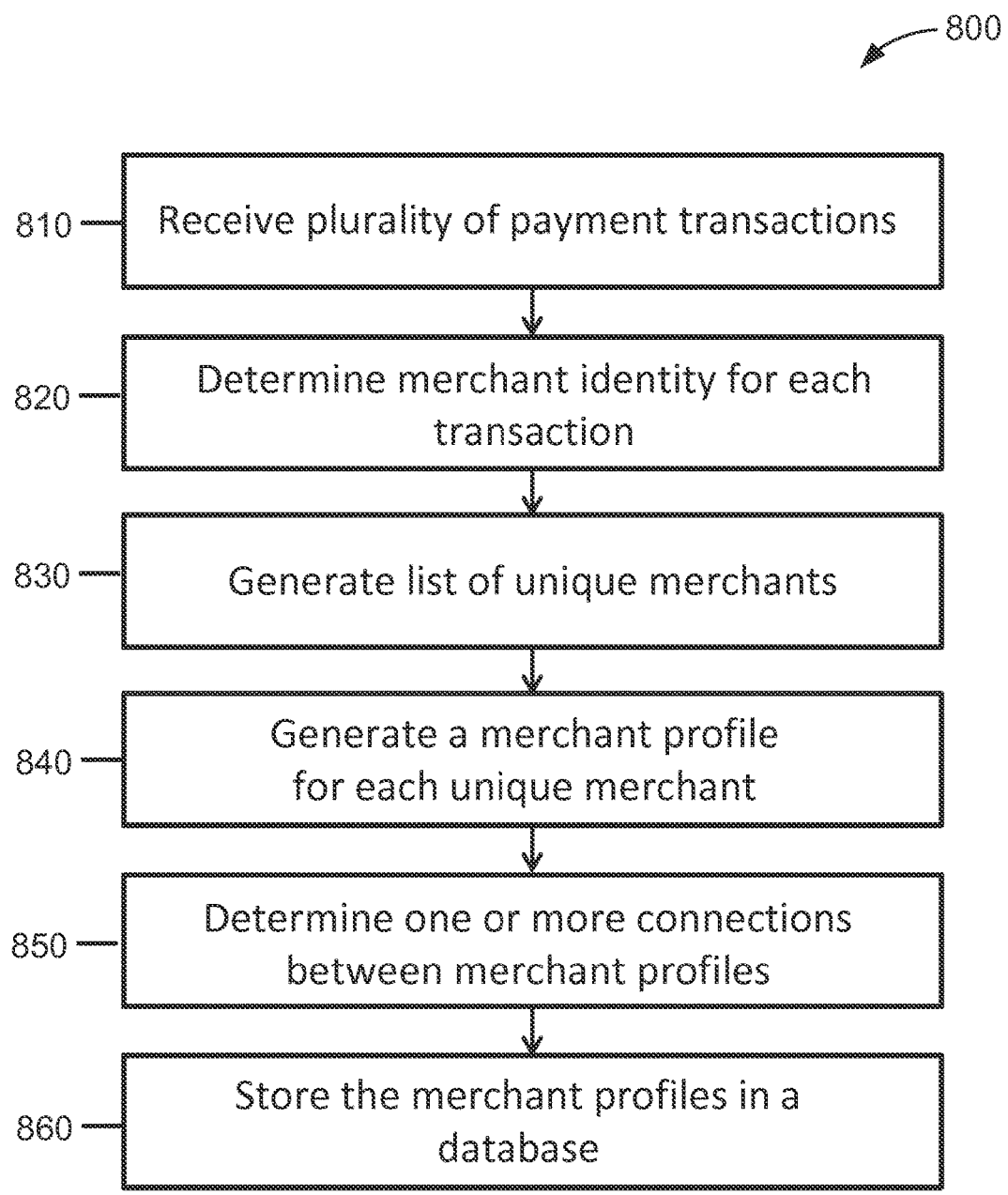

Processor 505 executes computer-executable instructions for implementing aspects of the disclosure. In some embodiments, the processor 505 is transformed into a special purpose microprocessor by executing computer-executable instructions or by otherwise being programmed. For example, the processor 505 is programmed with the instruction such as illustrated in FIG. 8.

Figure 6:
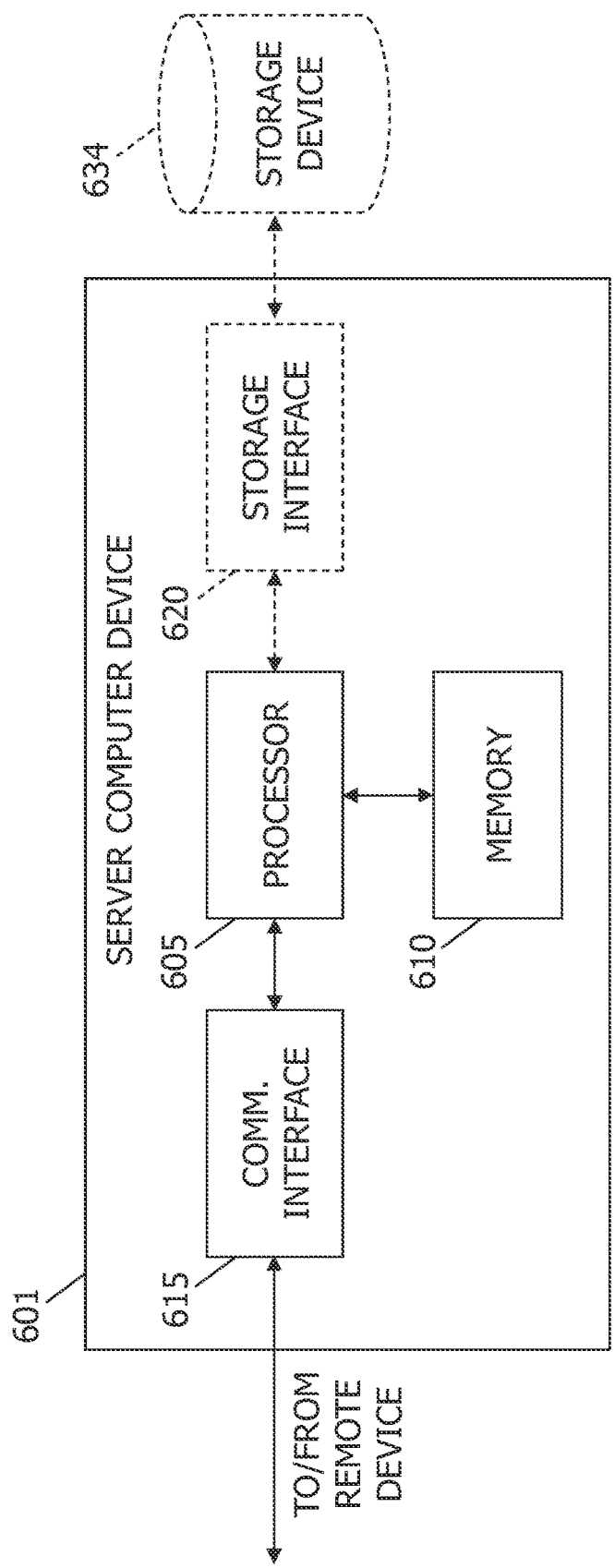

FIG. 6 illustrates an example configuration of MI computer device 406 shown in FIG. 4, in accordance with one embodiment of the present disclosure. Server computer device 601 may include, but is not limited to, database server 408 (shown in FIG. 4). Server computer device 601 also includes a processor 605 for executing instructions. Instructions may be stored in a memory area 610. Processor 605 may include one or more processing units (e.g., in a multi-core configuration).

Processor 605 is operatively coupled to a communication interface 615 such that server computer device 601 is capable of communicating with a remote device such as another server computer device 601 or client systems 412 (shown in FIG. 4). For example, communication interface 615 may receive requests from client systems 412 via the Internet, as illustrated in FIG. 4.

Processor 605 may also be operatively coupled to a storage device 634. Storage device 634 is any computer-operated hardware suitable for storing and/or retrieving data, such as, but not limited to, data associated with database 410 (shown in FIG. 4). In some embodiments, storage device 634 is integrated in server computer device 601. For example, server computer device 601 may include one or more hard disk drives as storage device 634. In other embodiments, storage device 634 is external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Figure 9:
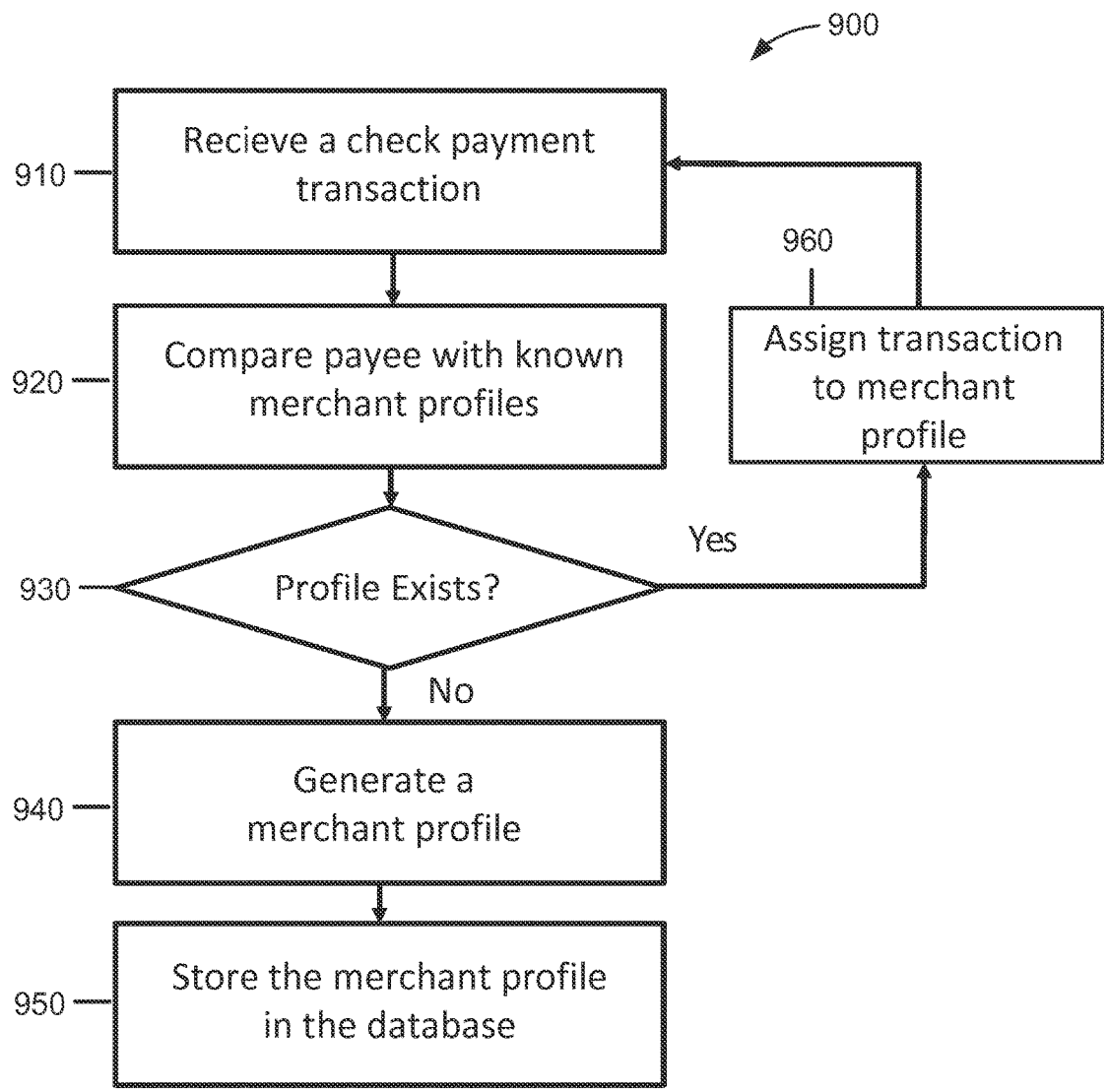

Processor 605 executes computer-executable instructions for implementing aspects of the disclosure. In some embodiments, the processor 605 is transformed into a special purpose microprocessor by executing computer-executable instructions or by otherwise being programmed. For example, the processor 605 is programmed with the instruction such as illustrated in FIGS. 8 and 9.

Figure 7:
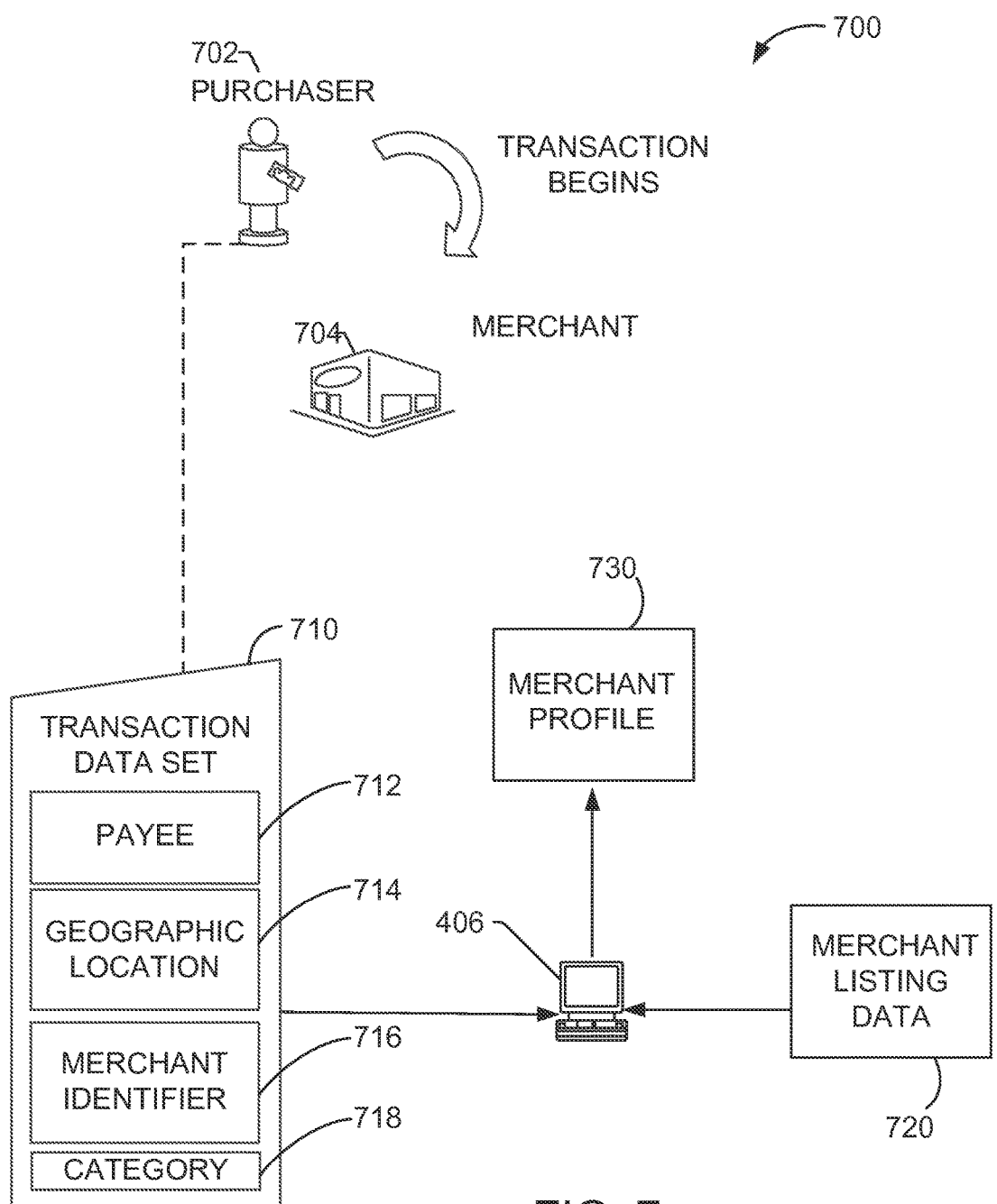

FIG. 7 is a simplified block diagram of an example embodiment of a system 700 for determining which merchants are associated with which transactions from a plurality of transactions received from the payment card processing system 404 and the check processing system 402 (both shown in FIG. 4). In the example embodiment, a purchaser 702 tenders payment to a merchant 704. Purchaser 702 may be customer 102 (shown in FIG. 1) or cardholder 322 (shown in FIG. 3). Merchant 704 may be merchant 104 (shown in FIG. 1) or merchant 324 (shown in FIG. 3). As described above, before or during the clearing process, transaction data is transferred among the parties processing a payment card or check transaction, as shown in FIGS. 1 and 3. Such transaction data includes transaction data set 710. In the example embodiment, transaction data set 710 includes geographic location 714, merchant identifier 716, and category 718. Geographic location 714 may be any geographic identifier including, for example and without limitation, a postal code, a city/town/municipality, a neighborhood in a city/town/municipality, GPS coordinates, a county, a street address, a unit number, and sub-divisions of any of the preceding geographic identifiers. In the example embodiment, merchant identifier 716 is a unique identifier that identifies that merchant. In some embodiments, merchant identifier 716 may be the merchant's name. In other embodiments, merchant identifier 716 may be an alphanumeric string used to identify the merchant. Category 718 may be restaurant, fuel, rental property, banking, retail, clothing, transportation, or any indicator of an industry that the merchant is a part of or the goods and/or services that the merchant provides.

In the case of payment card transactions, geographic location 714, merchant identifier 716, and category 718 may be determined from the transaction data. In the example embodiment, transaction data includes the address of the merchant which maps to geographic location 714, a unique identifier for the merchant or merchant account which maps to merchant identifier 716, and a category 718 for the merchant.

In the case of check transactions, transaction data set 710 is also determined from transaction data, but may require multiple fields to be analyzed to determine transaction data set 710. In the example embodiment, MI computer device 406 receives the individual fields from the checks in the transaction from the check processing system 402. In other embodiments, MI computer device 406 receives images of the scanned checks from the check processing system 402. In these other embodiments, MI computer device 406 captures the fields from the scanned image of the check itself.

In the example embodiment, MI computer device 406 determines the merchant 704 associated with a transaction from the transaction data received. MI computer device 406 may determine the merchant by analyzing the payee field 206 (shown in FIG. 2) of the check. MI computer device 406 may also analyze the memo field 218 and the address field 216 of the account holder, both shown in FIG. 2, to determine the identity of the merchant associated with that transaction. For example, a check transaction may have "Groceries & Gas" written in the payee field 206. Since there are over 200 Groceries & Gas stores, MI computer device 406 reviews the address field 216 and the memo field 218 of the check. If the memo field 218 state groceries, then MI computer device 406 determines that there is a high likelihood that the Groceries and Gas store associated with that transaction is the one closest to the address of the payor, since most people buy groceries close to home. If there is a merchant profile 730 for the identified merchant, then MI computer device 406 associates the transaction with the merchant profile 730, otherwise, MI computer device 406 determines a merchant identifier 716 for the transaction data set 710.

In some embodiments, MI computer device 406 may determine category 718 from memo field 718. For example, if memo field 718 states "Clothing for School", then MI computer device 406 determines that the category 718 for the associated merchant is potentially retail clothing. MI computer device 406 may update category 718 based on a plurality of transactions.

In the example embodiment, MI computer device 406 stores transaction data sets 710 without including any protected personal information. Personally identifiable information is information that can be used on its own or with other information to identify, contact, or locate a single person, or to identify an individual in context. Accordingly, information which can identify purchaser 702 is not stored at MI computer device 406. In alternative embodiments, personally identifiable information may be otherwise safeguarded by the policies of systems using transaction data sets 710. In such alternative embodiments, personally identifiable information may be available, for example if the individual consents to his PII being available.

MI computer device 406 also receives merchant listing data 720. Merchant listing data 720 represents publically available data about merchants 704. Merchant listing data 720 may also include, for example and without limitation, affiliated merchants, corporate hierarchy, parent corporations, subsidiaries, other name merchant is doing business as, and corporate annual reports. Merchant listing data 720 may be stored in a database accessible to MI computer device 406, retrieved from an external service or database, retrieved from online or offline publications, or manually entered into MI computer device 406. In one example, merchant listing data 720 may be matched to transaction data set 710 based upon geographic location 714. For example, merchant listing data 720 for a specific geographic location 714 is matched to transaction data set 710 corresponding to the same geographic location 714. In other examples, transaction data set 710 also includes merchant identifier 716.

In some embodiments, MI computer device 406 combines transaction data sets 710 and merchant listing data 720 to generate a merchant profile 730. In other embodiments, MI computer device 406 just processes transaction data sets 710 to generate the merchant profile. The merchant profile 730 may include, but is not limited to, a merchant identifier, a merchant category, transactions associated with that merchant, merchant location, connections to associated merchants, a description of the merchant, contact information, channel (i.e., e-commerce, brick and mortar, or phone order), other names associated with merchant, and logic to identify the merchant from check transaction data. In some embodiments, the merchant profile may also provide aggregated transactions over time, returns over time, and other merchant behavior patterns.

In the example embodiment, MI computer device 406 may receive a request from client device 412 (shown in FIG. 4) for one or more merchant profiles 730. MI computer device 406 receives a merchant name from client device 412. MI computer device 406 compares the received merchant name to the stored merchant profiles 730. If a match is found, then MI computer device 406 transmits the associated merchant profile to client device 412. In some embodiments, MI computer device 406 may determine that the merchant name could refer to multiple merchant profiles 730. In this embodiment, MI computer device 406 may request more clarification from client device 412 or may transmit all merchant profiles 730 associated with the received merchant name.

In another embodiment, MI computer device 406 may allow client devices 412 to access merchant profiles 730 and the associated transactions to run analytics on the transactions. The analytics may include determining check payments by industry, by merchant, and by geographic area. The analytics may also include comparing different payment channels, i.e., credit transactions vs. debit transactions vs. check transactions. The analytics may also be used for fraud analysis, to either detect fraudulent transactions or to improve existing fraud detection processes.

FIG. 8 is a flowchart of an example process 800 for creating merchant profiles using the payment processing system 400 and MI computer device 406 (both shown in FIG. 4) in accordance with one embodiment of the disclosure. MI computer device 406 receives 810 a plurality of payment transactions. The transactions may be for check transactions processed through check processing system 402 or for payment card transactions processed through payment card system 404 (both shown in FIG. 4). MI computer device 406 determines 820 an identity for the merchant associated with each transaction from the transaction data. In some embodiments, MI computer device 406 compares the transactions to a database with a complete list of payment card and check merchants. In other embodiments, MI computer device 406 uses logical rules to determine the merchant identity from the transaction data. If MI computer device 406 received the transaction data for the check transactions as scanned images, then MI computer device 406 performs optical character recognition analysis to populate the fields shown in FIG. 2. The merchant identity may be a name from payee field 206, or the merchant identity may be a combination of fields, such as, but not limited to payee field 206, memo field 218, and address field 216.

MI computer device 406 generates 830 a list of unique merchants from the transaction data. Unique merchants are merchants that are distinctive from the other merchants, potentially determined through distinct names. In some embodiments, MI computer device 406 may consider "Groceries & Gas #125" distinct from "Anytown Groceries and Gas" even if they refer to the same store, and further consider those two distinct from "G & G". In other embodiments, MI computer device 406 use logic to determine that "Anytown Groceries & Gas," "Anytown Groceries and Gas," "Groc & Gas Anytown," and "Grocery & Gus in Anytown," all refer to the same unique merchant. For each unique merchant, MI computer device 406 generates 840 a merchant profile 730 (shown in FIG. 7). Each merchant profile may contain all of the transactions associated with that unique merchant, as well as other information that MI computer device 406 determines based on the transactions.

MI computer device 406 analyzes the generated merchant profiles 730 to determine 850 connections between them. Connections represent a relationship or association between the two or more merchant profiles. For example, one merchant profile 730 may be for an individual store in a chain of stores, e.g., Groceries and Gas #125. In another example, a merchant profile 730 for an individual store may have multiple names, be called by a shortened name, or be doing business under a name that is different from its parent company. For example, MI computer device 406 may determine that the merchant profiles for "Groceries & Gas" and "Anytown Groceries and Gas" are related, potentially as a parent-child relationship. MI computer device 406 determines these associations based on comparing the transactions in each merchant profile. MI computer device 406 may create a hierarchy of merchant profiles 730 wherein the parent and child profiles would have connections to each other. For example, Gas and Groceries, Inc. would be a parent merchant and Gas and Groceries #125 would be a child of that parent. MI computer device 406 adds an association between the two merchant profiles 730 to each of the associated merchant profiles. MI computer device 406 may supplement these interconnections by including information from merchant listing data 720. MI computer device 406 then stores 860 the merchant profiles 730 in database 410.

FIG. 9 is a flowchart of an example process 900 for associating a check payment transaction with a merchant profile using the payment processing system 400 and MI computer device 406 (both shown in FIG. 4) in accordance with one embodiment of the disclosure. MI computer device 406 receives 910 a check payment transaction from check processing system 402 (shown in FIG. 4). MI computer device 406 compares 920 the payee field 206 of the check payment transaction with known merchant profiles 730 (shown in FIG. 7) stored in database 410 (shown in FIG. 4). MI computer device 406 determines 930 if a merchant profile 730 already exists for the merchant identified with the check payment transaction. If the determination is yes, then MI computer device 406 assigns 960 the transaction to the determined merchant profile 730 and proceeds to Step 910. If the determination is no, then MI computer device 406 generates 940 a merchant profile 730 for that merchant and stores 950 that merchant profile 730 in database 410.

Figure 10:
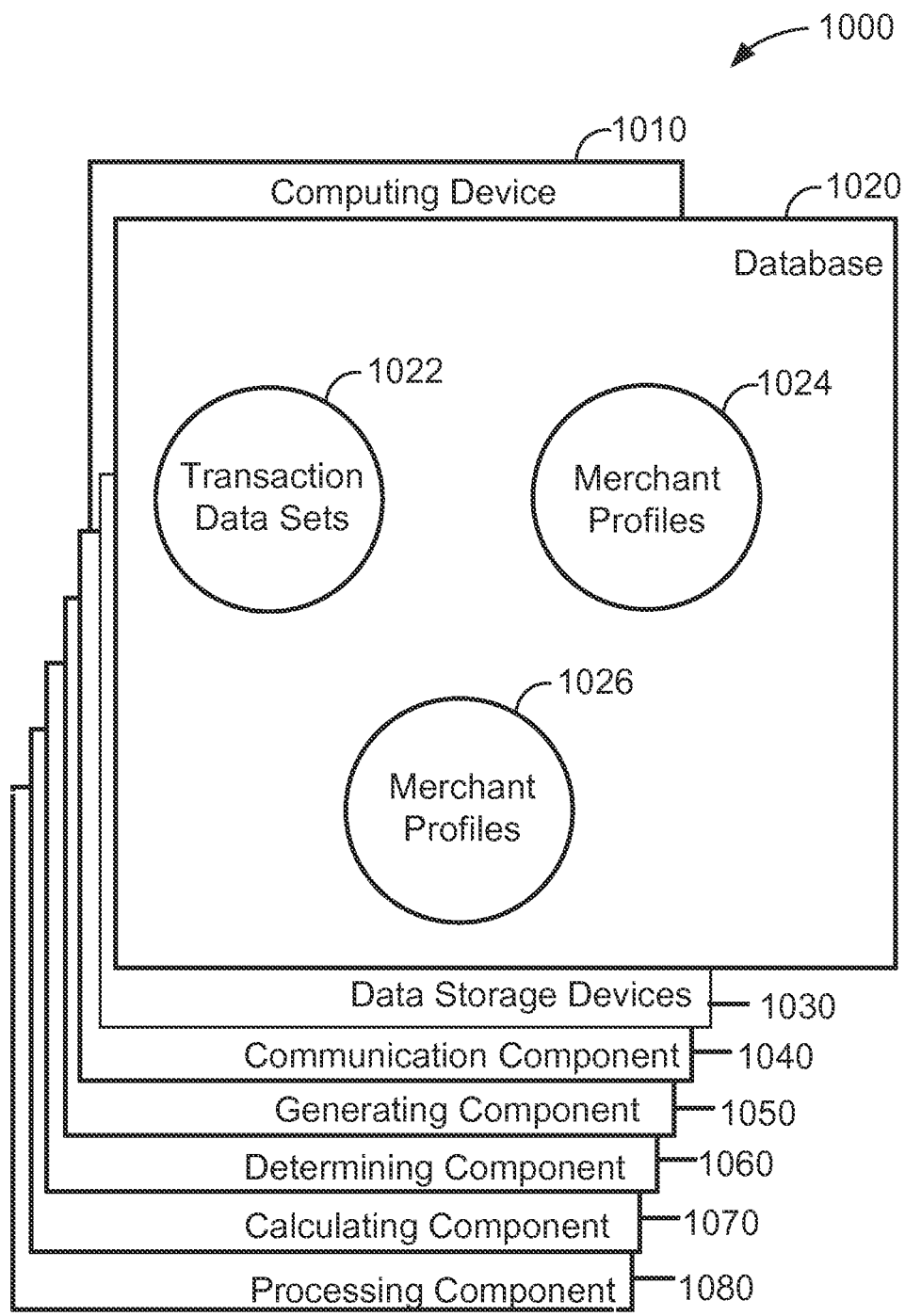

FIG. 10 is a diagram 1000 of components of one or more example computing devices that may be used in the system 400 shown in FIG. 4. In some embodiments, computing device 1010 is similar to MI computer device 406 (shown in FIG. 4). Database 1020 may be coupled with several separate components within computing device 1010, which perform specific tasks. In this embodiment, database 1020 includes transaction data sets 1022, which may be similar to transaction data sets 710 (shown in FIG. 7), merchant profiles 1024, and merchant listing data 1026, which may be similar to merchant listing data 720 (shown in FIG. 7). In some embodiments, database 1020 is similar to database 410 (shown in FIG. 4).

Computing device 1010 includes the database 1020, as well as data storage devices 1030. Computing device 1010 also includes a communication component 1040 for receiving transactions from check processing system 402 and payment card processing system 404 (both shown in FIG. 4) and for receiving merchant listing data 1026 from client system 412 (shown in FIG. 4). Computing device 1010 also includes a generating component 1050 for generating a list of unique merchants and generating merchant profiles. A determining component 1060 is also included for determining the identity of each merchant for each transaction and determining one or more connections between merchant profiles 730 (shown in FIG. 7). A processing component 1070 assists with execution of computer-executable instructions associated with the system.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer implemented method for creating merchant profiles based on check transactions, said method using a computing device having a processor communicatively coupled to a memory, said method comprising:
   receiving, by the processor, a plurality of check images, each check image associated with a check payment transaction, where each check image includes a plurality of fields from an associated check that includes at least a payee field, an address field, and a memo field;
   performing optical character recognition, by the processor, on each check image of the plurality of check images to identify the plurality of fields from the associated check, each of the plurality of fields including a corresponding value;
   capturing, by the processor, each corresponding value included in the plurality of fields of each check image;
   generating, by the processor, a list of unique merchants based in part on the corresponding value included in each of the payee fields of the plurality of check images;
   generating, by the processor, a check-based merchant profile for each unique merchant of the list of unique merchants based on the corresponding values of the payee field, the address field, and the memo field;
   storing, in a database, the check-based merchant profiles;
   determining, by the processor, one or more connections between two or more check-based merchant profiles, wherein the connection represents a relationship or association between the two or more check-based merchant profiles, by:
      comparing, by the processor, the check-based merchant profiles generated for each unique merchant of the list of unique merchants based in part on one or more rules;
      determining, by the processor, that two or more of the check-based merchant profiles correspond to associated merchants; and
      linking, by the processor, in the database, each of the two or more check-based merchant profiles of the associated merchants, wherein a connection is stored in the database and includes a link to a storage location in the database where each of the two or more check-based merchant profiles of the associated merchants are stored;
   updating, in the database, the two or more check-based merchant profiles with the one or more connections;
   receiving, by the processor, one or more card-based merchant profiles based on payment card transactions, where the one or more card-based merchant profiles contain merchant data, and wherein the one or more card-based merchant profiles are stored in the database;
   determining, by the processor, a first merchant profile based on check payment transactions with the same merchant as at least one of the one or more card-based merchant profiles;
   generating, by the processor, a connection between the first merchant profile and the at least one card-based merchant profile; and
   storing, in the first merchant profile, the merchant data from the at least one card-based merchant profile and the connection.

2. The method in accordance with claim 1, further comprises:
   receiving, by the processor, a merchant name from a client device;
   determining, by the processor, one or more merchant profiles associated with the received merchant name; and
   transmitting, by the processor, the one or more determined merchant profiles to the client device.

3. The method in accordance with claim 2, wherein determining one or more merchant profiles further comprises:
   creating, by the processor, a merchant profile for each unique merchant, where the merchant profile includes one or more payment transactions associated with the corresponding unique merchant;
   determining, by the processor, one or more categories for each unique merchant based in part on the one or more payment transactions associated with the corresponding unique merchant; and
   determining, by the processor, a geographic location for each unique merchant based in part on the one or more payment transactions associated with the corresponding unique merchant.

4. The method in accordance with claim 2, wherein determining one or more merchant profiles further comprises:
   receiving, by the processor, merchant listing data for a first unique merchant including additional information about the first unique merchant; and
   adding, by the processor, the merchant listing data to the merchant profile associated with the first unique merchant.

5. The method in accordance with claim 2, further comprising analyzing, by the processor, the one or more merchant profiles for one or more patterns, where the one or more patterns include at least one of transactions by geographic location, transactions by merchant, transactions by category, a comparison of check and payment card transactions, and potentially fraudulent transactions.

6. The method in accordance with claim 2 further comprising:
   storing the list of unique merchants and the check-based merchant profiles in the database;
   receiving, by the processor, a scan of a check for a check payment transaction with a merchant;
   performing, by the processor, optical character recognition on the check to identify the plurality of fields including the payee field, the address field, and the memo field;

determining, by the processor, the merchant name based on at least one of the corresponding values included in the payee field, the address field, and the memo field;

determining, by the processor, a geographic location of the merchant based on the corresponding value of the payee field and the address field;

determining, by the processor, a merchant category based on at least one of the corresponding value of the payee field and the memo field; and comparing, by the processor, the merchant name, the geographic location, and the merchant category to a set of fields in the database to determine a merchant identifier for the merchant.

7. The method in accordance with claim 1, wherein generating a list of unique merchants further comprises:

determining, by the processor, a merchant name for each payment transaction based in part on the corresponding values included in the payee field, the memo field, and the address field of the check associated with the corresponding check payment transaction;

determining, by the processor, two or more check payment transactions with the same or substantially similar merchant names based in part on one or more rules; and determining, by the processor, a merchant identifier to associate with the two or more check payment transactions.

8. The method in accordance with claim 1, further comprising removing, by the processor, personally identifiable information from each check payment transaction.

9. A computing device for creating merchant profiles based on check payment transactions, said computing device comprising one or more processors communicatively coupled to one or more memory devices, said computing device configured to:

receive a plurality of check images, each check image associated with a check payment transaction, where each check image includes a plurality of fields from an associated check that includes at least a payee field, an address field, and a memo field;

perform optical character recognition on each check image of the plurality of check images to identify the plurality of fields from the associated check, each of the plurality of fields including a corresponding value;

capture each corresponding value included in the plurality of fields of each check image;

generate a list of unique merchants based in part on the corresponding value included in each of the payee fields of the plurality of check images;

generate a check-based merchant profile for each unique merchant of the list of unique merchants based on the corresponding values of the payee field, the address field, and the memo field;

store, in a database, the check-based merchant profiles;

determine one or more connections between two or more check-based merchant profiles, wherein the connection represents a relationship or association between the two or more check-based merchant profiles, by:

comparing the check-based merchant profiles generated for each unique merchant of the list of unique merchants based in part on one or more rules;

determining that two or more of the check-based merchant profiles correspond to associated merchants; and linking in the database each of the two or more check-based merchant profiles of the associated merchants, wherein a connection is stored in the database and includes a link to a storage location in the database where each of the two or more check-based merchant profiles of the associated merchants are stored;

update, in the database, the two or more check-based merchant profiles with the one or more connections;

receive one or more card-based merchant profiles based on payment card transactions, where the one or more card-based merchant profiles contain merchant data, and wherein the one or more card-based merchant profiles are stored in the database;

determine a first merchant profile based on check payment transactions with the same merchant as at least one of the one or more card-based merchant profiles;

generate a connection between the first merchant profile and the at least one card-based merchant profile; and store, in the first merchant profile, the merchant data from the at least one card-based merchant profile and the connection.

10. The computing device of claim 9 further configured to:

receive a merchant name from a client device;

determine one or more merchant profiles associated with the received merchant name; and transmit the determined merchant profile to the client device.

11. The computing device of claim 9 further configured to:

determine a merchant name for each payment transaction based in part on the corresponding values included in the payee field, the memo field, and the address field of the check associated with the corresponding check payment transaction;

determine two or more check payment transactions with the same or substantially similar merchant names based in part on one or more rules; and determine a merchant identifier to associate with the two or more check payment transactions.

12. The computing device of claim 9 further configured to:

create a merchant profile for each unique merchant, where the merchant profile includes one or more payment transactions associated with the corresponding unique merchant;

determine one or more categories for each unique merchant based in part on the one or more payment transactions associated with the corresponding unique merchant; and determine a geographic location for each unique merchant based in part on the one or more payment transactions associated with the corresponding unique merchant.

13. The computing device of claim 12 further configured to:

receive merchant listing data for a first unique merchant including additional information about the first unique merchant; and add the merchant listing data to the merchant profile associated with the first unique merchant.

14. A computer-readable storage medium having computer-executable instructions embodied thereon, wherein when executed by a computing device having at least one processor coupled to at least one memory device, the computer-executable instructions cause the processor to:

receive a plurality of check images, each check image associated with a check payment transaction, where each check image includes a plurality of fields from an associated check that includes at least a payee field, an address field, and a memo field;

perform optical character recognition on each check image of the plurality of check images to identify the plurality of fields from the associated check, each of the plurality of fields including a corresponding value;

capture each corresponding value included in the plurality of fields of each check image;

generate a list of unique merchants based in part on the corresponding value included in each of the payee fields of the plurality of check images;

generate a check-based merchant profile for each unique merchant of the list of unique merchants based on the corresponding values of the payee field, the address field, and the memo field;

storing, in a database, the check-based merchant profiles;

determine one or more connections between two or more check-based merchant profiles, wherein the connection represents a relationship or association between the two or more check-based merchant profiles, by:

comparing the check-based merchant profiles generated for each unique merchant of the list of unique merchants based in part on one or more rules;

determining that two or more of the check-based merchant profiles correspond to associated merchants; and linking in the database each of the two or more check-based merchant profiles of the associated merchants, wherein a connection is stored in the database and includes a link to a storage location in the database where each of the two or more check-based merchant profiles of the associated merchants are stored;

update, in the database, the two or more check-based merchant profiles with the one or more connections;

receive one or more card-based merchant profiles based on payment card transactions, where the one or more card-based merchant profiles contain merchant data, and wherein the one or more card-based merchant profiles are stored in the database;

determine a first merchant profile based on check payment transactions with the same merchant as at least one of the one or more card-based merchant profiles;

generate a connection between the first merchant profile and the at least one card-based merchant profile; and store, in the first merchant profile, the merchant data from the at least one card-based merchant profile and the connection.

15. The computer-readable storage medium of claim 14, wherein the computer-executable instructions further cause the processor to:

receive a merchant name from a client device;

determine one or more merchant profiles associated with the received merchant name; and transmit the determined merchant profile to the client device.

16. The computer-readable storage medium of claim 14, wherein the computer-executable instructions further cause the processor to:

determine a merchant name for each payment transaction based in part on the corresponding values included in the payee field, the memo field, and the address field of the check associated with the corresponding check payment transaction;

determine two or more check payment transactions with the same or substantially similar merchant names based in part on one or more rules; and determine a merchant identifier to associate with the two or more check payment transactions.

17. The computer-readable storage medium of claim 14, wherein the computer-executable instructions further cause the processor to:

create a merchant profile for each unique merchant, where the merchant profile includes one or more payment transactions associated with the corresponding unique merchant;

determine one or more categories for each unique merchant based in part on the one or more payment transactions associated with the corresponding unique merchant; and determine a geographic location for each unique merchant based in part on the one or more payment transactions associated with the corresponding unique merchant.

18. The computer-readable storage medium of claim 17, wherein the computer-executable instructions further cause the processor to:

receive merchant listing data for a first unique merchant including additional information about the first unique merchant; and add the merchant listing data to the merchant profile associated with the first unique merchant.

* * * * *